United States Patent
Narayanan et al.

[11] 3,917,689
[45] Nov. 4, 1975

[54] ADAMANTYL THIADIAZOLE INTERMEDIATES

[75] Inventors: Venkatachala L. Narayanan, North Brunswick; Jack Bernstein, New Brunswick, both of N.J.

[73] Assignee: E. R. Squibb & Sons, Inc., Princeton, N.J.

[22] Filed: Aug. 3, 1972

[21] Appl. No.: 277,699

Related U.S. Application Data

[60] Continuation-in-part of Ser. No. 842,376, July 16, 1969, abandoned, which is a division of Ser. No. 670,756, Sept. 26, 1967, Pat. No. 3,483,204, which is a continuation-in-part of Ser. No. 523,249, Jan. 27, 1966, abandoned.

[52] U.S. Cl. .......................................... 260/552 SC
[51] Int. Cl.² ........................................ C07C 157/05
[58] Field of Search ............................ 260/552 SC

[56] References Cited
UNITED STATES PATENTS

| | | | |
|---|---|---|---|
| 3,300,480 | 1/1967 | Narayanan | 260/552 SC X |
| 3,406,180 | 10/1968 | Sallay et al. | 260/552 SC X |
| 3,483,204 | 12/1969 | Narayanan et al. | 260/552 SC X |

*Primary Examiner*—Gerald A. Schwartz
*Attorney, Agent, or Firm*—Lawrence S. Levinson; Merle J. Smith

[57] ABSTRACT

This invention relates to new intermediates for certain adamantyl thiadiazoles. These intermediates have the formula

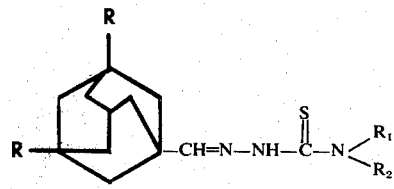

wherein each R represents hydrogen, halogen, lower alkyl or lower alkanoylamido. $R_1$ represents hydrogen and $R_2$ represents adamantyl, hydroxy-lower alkyl or phenyl-lower alkyl.

These compounds are intermediates for compounds of the formula

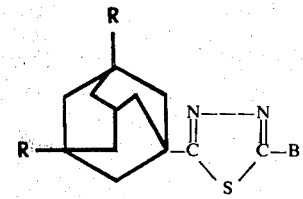

10 Claims, No Drawings

ADAMANTYL THIADIAZOLE INTERMEDIATES

This application is a continuation-in-part of application Ser. No. 842,376, filed July 16, 1969 now abandoned, which is a division of application Ser. No. 670,756, filed Sept. 26, 1967, now U.S. Pat. No. 3,483,204, which in turn is a continuation-in-part of application Ser. No. 523,249, filed Jan. 27, 1966, and now abandoned.

SUMMARY OF THE INVENTION

This invention relates to intermediates for certain adamantyl thiadiazole compounds having the structural formula (I)

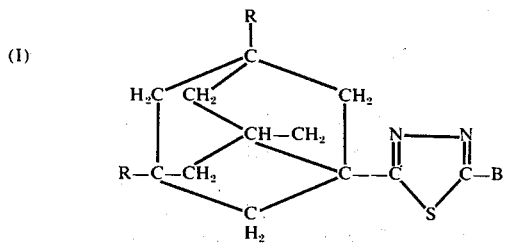

and to salts thereof which are the subject of U.S. Pat. No. 3,483,204.

These intermediates have the formula (II)

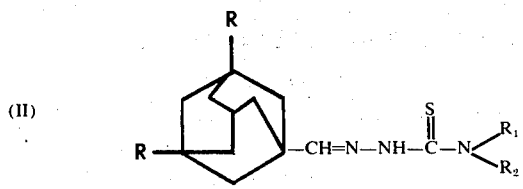

DETAILED DESCRIPTION OF THE INVENTION

Each R in formula II represents hydrogen, halogen, lower alkyl or lower alkanoylamino. They may be the same or different in a given compound.

$R_1$ represents hydrogen and $R_2$ represents adamantyl, hydroxy-lower alkyl or phenyl-lower alkyl.

B in formula I represents the basic nitrogen-containing radical symbolized by (III)

in which $R_1$ and $R_2$ represent groups forming with the nitrogen a class of acyclic and heterocyclic amine radicals as defined in the patent referred to. These include, along with others, the particular $R_1$ and $R_2$ groups as defined in connection with the intermediates of formula II with which this application is concerned.

The lower alkyl groups represented by the symbols include straight and branched chain saturated aliphatic groups such as methyl, ethyl, propyl, isopropyl, butyl, isobutyl, t-butyl, amyl, isoamyl, hexyl and the like. Methyl and ethyl are preferred.

Each of the four halogens is contemplated by the term "halo", but chlorine and bromine are preferred.

The lower alkanoyl groups are the acyl moieties derived from lower fatty acids containing alkyl groups of the character described above and include, for example, acetyl, propionyl, butyryl and the like.

The adamantyl groups in formula I, including those represented by $R_1$ encompass unsubstituted adamantyl and simply substituted adamantyl (the substituted groups bearing the substituent in the 3 and/or 5-position) e.g., 3-R, 5-R-adamantyl, wherein each has the same meaning as above.

Especially preferred within the groups are those wherein the halogens are chlorine or bromine, the lower alkyl group is methyl, the lower alkylamido group is acetamido, the phenyl-lower alkyl group is benzyl and the hydroxy-lower alkyl group is hydroxyethyl. There is preferably only one lower alkanoylamido group on the adamantane ring.

The compounds of this invention and those derived from them may be prepared by the following series of reactions. An unsubstituted 1-adamantanecarboxylic acid, or one having one or two of the substituents R, is caused to react with thionyl chloride to form the corresponding unsubstituted or substituted 1-adamantanecarboxylic acid chloride. This reaction may be effected by heating the reactants, e.g., up to about reflux temperature.

The acid chloride thus obtained is converted to the 1-adamantyl-1-aziridinyl ketone by reaction with ethyleneimine, e.g., by addition of a solution of the acid chloride in an inert organic solvent such as ether to ethyleneimine in the same or similar solvent in the presence of an acid acceptor such as pyridine or alkylamine like triethylamine.

The ketone is converted to the 1-adamantaldehyde by reduction, e.g., with lithium aluminum hydride in an inert medium such as ether with cooling. This aldehyde is reacted with a thiosemicarbazide of the formula (IV)

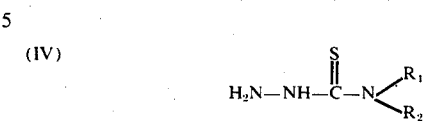

e.g., in a medium such as alcohol and then heating up to about reflux temperature.

The product thiosemicarbazone has the formula (V)

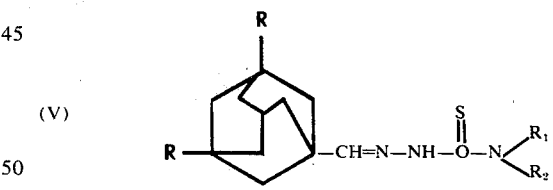

Reaction of the new intermediates of formula V with an oxidizing agent such as ferric chloride, hydrogen peroxide, iodine or the like in an inert solvent such as alcohol at about room temperature induces cyclization and formation of the product of formula I. In the event the product forms as an acid salt, the free base may be obtained by neutralization with a base.

The products of formula I are useful as topical fungal disinfectants, e.g., in protecting animals against *Aspergillus niger*, *Chaetomium globosum* or the like, and may be applied topically to the affected area or to surfaces in aqueous solution or suspension, or in creams or ointments, at a concentration of about 1%, two to four times daily.

The following examples are illustrative of the invention. Temperatures are expressed on the centigrade scale.

EXAMPLE 1

A. 1-Adamantanecarboxylic acid chloride

To 18 g. of 1-adamantanecarboxylic acid, 50 ml. of thionyl chloride are added with cooling and the mixture is heated under reflux for 30 minutes. The excess of thionyl chloride is removed in vacuo, the addition of 2 × 30 ml. of dry benzene (benzene dried over silica gel) and evaporation serving to remove the last traces. Anhydrous ether (30 ml.) is added, and the solution evaporated leaving 19.2 g. of 1-adamantanecarboxylic acid chloride as a brownish white solid; $\lambda_{max}^{Nujol}$ 5.61 $\mu$ (C=O of acid chloride)

B. 1-Adamantyl-1-aziridinyl ketone

The acid chloride obtained above is dissolved in 125 ml. of dry ether, and added dropwise with stirring (addition time 30 minutes) to a mixture of 4.3 g. of ethyleneimine and 10.1 g. of triethylamine, dissolved in 200 ml. of dry ether, and cooled in an ice-salt mixture. After completing the addition, the ice-bath is removed, and the mixture is stirred for another 30 minutes. The solid triethylamine hydrochloride that precipitates is filtered off, washed with ether and dried. The ethereal solutions of the 1-adamantyl-1-aziridinyl ketone obtained are combined and made up to 400 ml. with dry ether $\lambda_{max}^{Nujol}$ single broad peak at 5.9 $\mu$ (amide C=O). The dry ethereal solution of the product is used as such for the next step.

C. Preparation of LAH solution

To 9 g. of lithium aluminum hydride, 200 ml. of dry ether are added, and the mixture is heated gently under reflux for 8 hours. The suspension is then allowed to stand at room temperature for 2 days, and the clear supernatant liquid is drawn off. The clear solution is analyzed for the LAH content by allowing an aliquot to evaporate at room temperature and then drying at 110° for 2 hours. Usually ca. 0.4 M solution results by this procedure.

D. 1-Adamantaldehyde

1-Adamantyl-1-aziridinyl ketone in dry ether (400 ml. of 0.1 M solution) is transferred to a 1 liter 3-necked flask fitted with an additional funnel, stirrer and protected by silica gel drying tubes. The flask is cooled in an ice-bath (external temp. 0°–3°), and to this cooled solution of 1-adamantaldehyde-1-aziridinyl ketone in dry ether, 75 ml. of 0.33 M LAH solution in dry ether are added dropwise with stirring (addition time 45 minutes). After the addition, the mixture is stirred for 30 minutes at the temperature of the ice-bath, and for an additional 30 minutes after removing the cooling bath. The reaction mixture is then treated with 200 ml. of 10% sulfuric acid. The ethereal layer is separated, washed successively with 2 × 100 ml. of water, 100 ml. of saturated sodium bicarbonate solution and finally with 200 ml. of water. The ethereal layer is dried overnight over anhydrous MgSO$_4$. Evaporation of ether gives 1-adamantanecarboxaldehyde as a thick pale yellow oil.

E. 1-Adamantanecarboxaldehyde 3-thiosemicarbazone

To a solution of 2.5 g. of 1-adamantanecarboxaldehyde in 40 ml. of absolute alcohol, a warm solution of 1.4 g. of thiosemicarbazide dissolved in a mixture of 50 ml. of water and 2 ml. of glacial acetic acid is added. The mixture is refluxed on a steam bath for 30 minutes. On cooling 1-adamantanecarboxaldehyde 3-thiosemicarbazone is obtained as a voluminous mass of yellow-white crystals, m.p. 187°–189°. An analytical sample is obtained by recrystallizing from methanol-water and drying at 75° in vacuo m.p. 193°–194°.

Anal. Calc'd for $C_{12}H_{19}N_3S$: C, 60.66; H, 8.07; N, 13.51. Found: C, 60.68; H, 8.16; H, 13.41.

F. 2-(1-Adamantyl)-5-amino-1,3,4-thiadiazole hydrochloride 2.3 g. of 1-adamantanecarboxaldehyde 3-thiosemicarbazone are dissolved in 25 ml. of warm 95% alcohol. To this solution 20 ml. of 1 M ferric chloride solution are added and the mixture stirred overnight at room temperature. The solution is filtered and concentrated to give 2-(1-adamantyl)-5-amino-1,3,4-thiadiazole hydrochloride as a white solid. It is crystalized from 95% alcohol to give yellowish white crystals, m.p. 262°–264°.

Anal. Calc'd for $C_{12}H_{17}N_3S \cdot HCl$: C, 53.10; H, 6.70; N, 16.44; S, 11.83. Found: C, 53.62; N, 7.01; N, 16.38; S, 12.15.

G. 2-(1-Adamantyl)-5-amino-1,3,4-thiadiazole

To 700 mg. of 2-(1-adamantyl)-5-amino-1,3,4-thiadiazole hydrochloride 20 ml. of warm alcohol are added. The solution is cooled and made alkaline with dilute ammonia solution. The precipitate that separates upon dilution is extracted with chloroform. Evaporation of the chloroform solution leaves a white solid, 500 mg. It is recrystallized from alcohol-water to give shiny white crystals, m.p. 200°–203° $\tau$ CDCl$_3$ 7.96 (10H), 8.23 (6H), 4.39 (2H).

Anal. Calc'd for $C_{12}H_{17}N_3S$: C, 61.25; H, 7.28; N, 17.86. Found: C, 61.32; H, 7.65; N, 17.91.

EXAMPLE 2

A. 4-Methyl-3-thiosemicarbazide

To a solution of 20.5 g. (0.28 mole) of methylisothiocyanate in 200 ml. of ethanol, 15 ml. of 95 l. hydrazine hydrate diluted with 10 ml. of water are added. The solution is shaken for 10 minutes, cooled, and the precipitate is collected and crystallized from methanol to give 27.3 g. (93 l. yield) of 4-methyl-3-thiosemicarbazide, m.p. 136.5°–137°.

B. Adamantaldehyde 4-methyl-3-thiosemicarbazone

A solution of 3.3 g. (0.02 mole) of adamantaldehyde in 50 ml. of absolute alcohol is treated with 2.1 g. (0.02 mole) of 4-methyl-3-thiosemicarbazide, following the procedure of Example 1E to give the product.

C. 2-(1-Adamantyl)-5-methylamino-1,3,4-thiadiazole hydrochloride

Following the procedure of Example 1F, 2.4 g. of adamantaldehyde 4-methyl-3-thiosemicarbazone is treated with 20 ml. of 1M ferric chloride solution to give 2-(1-adamantyl)-5-methylamino-1,3,4-thiadiazole hydrochloride.

EXAMPLE 3

A. 4,4-Diethyl-3-thiosemicarbazide 10.4 g. of diethylthiocarbamylthioglycolic acid are dissolved in 25 ml. of 2N sodium hydroxide solution. This is then treated with 5 ml. of hydrazine hydrate for 3–4 hours. On cooling, 2.9 g. (40 l. yield) of product, m.p. 84°–85° is obtained.

B. 3-Methyl-1-adamantaldehyde

Following the procedure of Example 1A–D, but using 19.4 g. of 3-methyl-1-adamantanecarboxylic acid as starting material, 3-methyl-1-adamantaldehyde is obtained.

C. 3-Methyl-1-adamantaldehyde 4,4-diethyl-3-thiosemicarbazone

Following the procedure of Example 1E, a solution of 3.56 g. of 3-methyl-1-adamantaldehyde is reacted with 2.38 g. of 4,4-diethyl-3-thiosemicarbazide to obtain 3-methyl-1-adamantaldehyde 4-diethyl-3-thiosemicarbazone.

D. 2-(3-Methyl-1-adamantyl)-5-diethylamino-1,3,4-thiadiazole hydrochloride

Following the procedure of Example 1F, employing 2.89 g. of 3-methyl-1-adamantaldehyde 4-diethyl-3-thiosemicarbazone and 20 ml. of 1M ferric chloride solution, 2-(3-methyl-1-adamantyl)-5-diethylamino-1,3,4-thiadiazole hydrochloride is obtained.

EXAMPLE 4

A. 4-Benzyl-3-thiosemicarbazide

A solution of 14.9 g. (0.1 mole) of benzylisothiocyanate in 100 ml. of ethanol is reacted with 6 ml. of 95 l. hydrazine hydrate as in Example 2A to give 12.6 g. (70 l. yield) of 4-benzyl-3-thiosemicarbazide, m.p. 130°.

B. 3-Chloro-1-adamantaldehyde

Following the procedure of Example 1A-D, but employing 21.6 g. (0.1 mole) of 3-chloro-1-adamantanecarboxylic acid, 3-chloro-1-adamantaldehyde is synthesized.

C. 3-Chloro-1-adamantaldehyde 4-benzyl-3-thiosemicarbazone

Following the procedure of Example 1E by reacting 3.97 g. (0.02 mole) of 3-chloro-1-adamantaldehyde with 3.06 g. of 4-benzyl-3-thiosemicarbazide, 3-chloro-1-adamantaldehyde 4-benzyl-3-thiosemicarbazone is obtained.

D. 2-(3-Chloro-1-adamantyl)-5-benzylamino-1,3,4-thiadiazole hydrochloride

Following the procedure of Example 1F, employing 3.33 g. (0.01 mole) of 3-chloro-1-adamantaldehyde 4-benzyl-3-thiosemicarbazone and 20 ml. of 1M ferric chloride solution, 2-(3-chloro-1-adamantyl)-5-benzylamino-1,3,4-thiadiazole hydrochloride is obtained. The free base is obtained by the procedure of Example 1G.

EXAMPLE 5

A. 3,5-Dimethyl-1-adamantaldehyde

Following the procedure of Example 1A-D, employing 20.9 g. (0.1 mole) of 3,5-dimethyl-1-adamantanecarboxylic acid, 3,5-dimethyl-1-adamantaldehyde is produced.

B. 3,5-Dimethyl-1-adamantaldehyde 3-thiosemicarbazone

Following the procedure of Example 1E employing 3.8 g. of 3,5-dimethyl-1-adamantaldehyde and 1.4 g. of thiosemicarbazide, 3,5-dimethyl-1-adamantaldehyde 3-thiosemicarbazone is obtained.

C. 3,5-Dimethyl-1-adamantaldehyde 3-thiosemicarbazone N,S-diacetate

To 2.4 g. (0.01 mole) of 3,5-dimethyl-1-adamantaldehyde 3-thiosemicarbazone, 10 ml. of acetic anhydride is added and the mixture is refluxed for 30 minutes. The reaction mixture is then poured into ice water and the precipitate is collected and washed with distilled water. it is subsequently crystallized from methanol-water to give shiny white crystals of the diacetate.

D. 2-(3,5-Dimethyl-1-adamantyl)-5-acetamino-1,3,4-thiadiazole

To a solution of 1.75 g. (0.005 mole) of 3,5-dimethyl-1-adamantaldehyde 3-thiosemicarbazone N,S-diacetate in 75 ml. of methyl alcohol cooled to 0°, a solution of 4.0 g. of hydrogen peroxide (100 vol.) in 10 ml. of glacial acetic acid is added dropwise and the mixture is stirred at 0° for 15 minutes. The mixture is allowed to warm up to room temperature and subsequently refluxed for 30 minutes. The solvent is removed in vacuo and hexane added when the product is precipitated. It is crystallized from a mixture of chloroform and hexane.

EXAMPLE 6

A. 4-(1-Adamantyl)-3-thiosemicarbazide

A solution of 19.3 g. (0.1 mole) of adamantylisothiocyanate (synthesized from adamantylthiourea by refluxing with acetic anhydride) is reacted with 6 ml. of 95 l. hydrazine hydrate as in Example 2A to give 4-(1-adamantyl)-3-thiosemicarbazide.

B. 3-Acetamido-1-adamantaldehyde

Following the procedure of Example 1A-D employing 23.8 g. (0.1 mole) of 3-acetamido-1-adamantanecarboxylic acid, 3-acetamido-1-adamantaldehyde is obtained.

C. 3-Acetamido-1-adamantaldehyde 4-(1-adamantyl)-3-thiosemicarbazone

Following the procedure of Example 1E by reacting 2.21 g. (0.01 mole) of 3-acetamido-1-adamantaldehyde with 1.98 g. (0.01 mole) of 4-(1-adamantyl)-3-thiosemicarbazide, 3-acetamido-1-adamantaldehyde 4-(1-adamantyl)-3-thiosemicarbazone is obtained.

D. 2-(3-Acetamido-1-adamantyl)-5-(1-adamantylamino)-1,3,4-thiadiazole hydrochloride Following the procedure of Example 1F employing 4.28 g. (0.01 mole) of 3-acetamido-1-adamantaldehyde 4-1-adamantyl-3-thiosemicarbazone and 20 ml. of 1M ferric chloride solution, 2-(3-acetamido-1-adamantyl)-5-(1-adamantylamino)-1,3,4-thiadiazole hydrochloride is obtained.

EXAMPLE 7

A. 4-β-Hydroxyethyl-3-thiosemicarbazide

To a solution of 12.2 g. of ethanolamine in 40 ml. of concentrated ammonium hydroxide, a mixture of 15 ml. of carbon disulfide and 50 ml. of alcohol is added gradually at 30°-40°. After complete dissolution of the $CS_2$ has occurred, the solution is allowed to stand for an hour. Then an equivalent amount of the sodium salt of chloracetic acid is added followed by 20 ml. of a 50% solution of hydrazine hydrate. The filtered solution is boiled for an hour and reduced to half its initial volume when crystals of 4-β-hydroxyethyl-3-thiosemicarbazide appear, m.p. 114°-115°.

B. 3,5-Dibromo-1-adamantaldehyde

Following the procedure of Example 1A-D, employing 33.9 g. (0.1 mole) of 3,5-dibromoadamantanecarboxylic acid, 3,5-dibromo-1-adamantaldehyde is obtained.

C. 3,5-Dibromo-1-adamantaldehyde 4-(β-hydroxyethyl)-3-thiosemicarbazone

Following the procedure of Example 1E and reacting 3.2 g. (0.01 mole) of 3,5-dibromo-1-adamantaldehyde with 1.1 g. (0.01 mole) of 4-β-hydroxyethyl-3-thiosemicarbazide, 3,5-dibromo-1-adamantaldehyde 4-(β-hydroxyethyl)-3-thiosemicarbazone is produced.

D. 2-(3,5-Dibromo-1-adamantyl)-5-(β-hydroxyethylamino)-1,3,4-thiadiazole hydrochloride Following the procedure of Example 1F employing 4.11 g. (0.01 mole) of 3,5-dibromo-1-adamantaldehyde 4-(β-hydroxyethyl)-3-thiosemicarbazone and 20 ml. of 1M ferric chloride solution, 2-(3,5-dibromo-1- adamantyl)-5-(β-hydroxyethylamino)-1,3,4-thiadiazole hydrochloride is obtained.

Similarly by following the procedure of Example 1 utilizing other substituted adamantaldehydes together with variously substituted thiosemicarbazides, additional products of formulas I and II above are obtained.

What is claimed is:

1. A compound of the formula

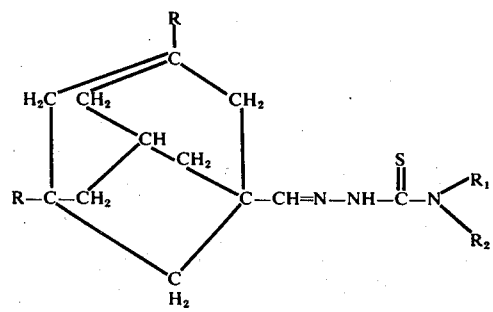

wherein each R is a member of the group consisting of hydrogen, halogen, lower alkyl and lower alkanoylamino, $R_1$ is hydrogen and $R_2$ is a member of the group consisting of 1-adamantyl, hydroxy-lower alkyl and phenyl-lower alkyl.

2. A compound as in claim 1 wherein one R is hydrogen and the other R is halogen, $R_1$ is hydrogen and $R_2$ is phenyl-lower alkyl.

3. A compound as in claim 2 wherein the halogen is chlorine and the phenyl-lower alkyl group is benzyl.

4. A compound as in claim 1 wherein each R is halogen, $R_1$ is hydrogen and $R_2$ is hydroxy-lower alkyl.

5. A compound as in claim 4 wherein each halogen is bromine and the hydroxy-lower alkyl group is hydroxyethyl.

6. A compound of the formula

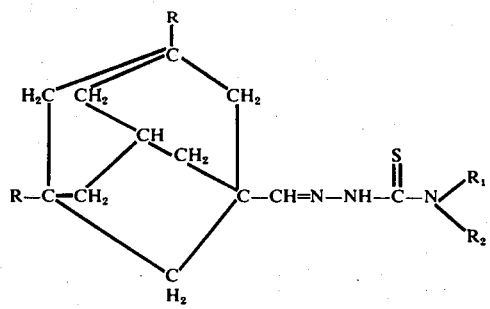

wherein each R is a member of the group consisting of hydrogen, halogen, lower alkyl and lower alkanoylamino, $R_1$ is hydrogen and $R_2$ is 1-adamantyl.

7. A compound as in claim 6 wherein one R is hydrogen and the other R is lower alkanoylamino.

8. A compound as in claim 7 wherein the lower alkanoylamino group is acetamino.

9. A compound as in claim 1 wherein each R is a member of the group consisting of hydrogen, halogen, lower alkyl and lower alkanoylamino, $R_1$ is hydrogen and $R_2$ is hydroxy-lower alkyl.

10. A compound as in claim 1 wherein each R is a member of the group consisting of hydrogen, halogen, lower alkyl and lower alkanoylamino, $R_1$ is hydrogen and $R_2$ is phenyl-lower alkyl.

* * * * *